(12) United States Patent
Carmack et al.

(10) Patent No.: US 10,331,441 B2
(45) Date of Patent: Jun. 25, 2019

(54) SOURCE CODE MAPPING THROUGH CONTEXT SPECIFIC KEY WORD INDEXES AND FINGERPRINTING

(71) Applicant: Amazon Technologies, Inc., Seattle, WA (US)

(72) Inventors: Scott Gerard Carmack, Mercer Island, WA (US); Narasimha Rao Lakkakula, Bothell, WA (US); Daniele Bellucci, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 15/814,064

(22) Filed: Nov. 15, 2017

(65) Prior Publication Data

US 2018/0074818 A1    Mar. 15, 2018

Related U.S. Application Data

(63) Continuation of application No. 14/579,184, filed on Dec. 22, 2014, now Pat. No. 9,823,922.

(51) Int. Cl.
*G06F 9/44*     (2018.01)
*G06F 8/73*     (2018.01)
*G06F 8/36*     (2018.01)

(52) U.S. Cl.
CPC . *G06F 8/73* (2013.01); *G06F 8/36* (2013.01)

(58) Field of Classification Search
None
See application file for complete search history.

(56) References Cited

U.S. PATENT DOCUMENTS

2012/0323940 A1    12/2012  Davis et al.
2014/0279851 A1*    9/2014  Rangarajan ............. G06F 16/40
                                                                707/609

OTHER PUBLICATIONS

AWS, "Sample POST Request and Response," Import/Export Developer Guide (API Version Jun. 3, 2010), AWS Documentation, © 2014 Amazon Web Services, Inc., http://docs.aws.amazon.com/AWSImportExport/latest/DG/SamplePOSTRequest.html, 2 pages.
Reitz, "Quickstart," Requests 2.5.1 documentation, © 2015 Python.org, http://docs.python-requests.org/en/latest/user/quickstart/, 8 pages.

* cited by examiner

*Primary Examiner* — Qamrun Nahar
(74) *Attorney, Agent, or Firm* — Davis Wright Tremaine LLP (57) ABSTRACT

The present disclosure describes a system and method that identifies locations in source code files that are associated with particular Web requests. The system generates a fingerprint for each Web request based at least in part on the parameters of each HTTP request. By fingerprinting the properties of the source code that generates each HTTP request, Web requests that are generated by executing the fingerprinted code can be traced back to specific source code files, and in some cases an exact line of code. In many examples, a webpage or an action on a webpage can be traced back to a line of source code that is associated with the request. This may allow a developer to find a software defect or security vulnerability by tracing Web requests of a running application and then mapping suspect Web requests back to corresponding lines of code.

20 Claims, 8 Drawing Sheets

Source Code Portion 380

```
@app.route('/login', methods=['POST', 'GET'])
def login():
    error = None
    if request.method == 'POST':
        if valid_login(request.form['username'],
                       request.form['password']):
            return log_the_user_in(request.form['username'])
        else:
            error = 'Invalid username/password' the code below is executed if the request method
    # was GET or the credentials were invalid
    return render_template('login.html', error=error)
```

SOURCE CODE MAPPING THROUGH CONTEXT SPECIFIC KEY WORD INDEXES AND FINGERPRINTING

CROSS REFERENCE TO RELATED APPLICATIONS

This application is a continuation of U.S. patent application Ser. No. 14/579,184, filed on Dec. 22, 2014, the disclosure of which is incorporated herein by reference in its entirety.

BACKGROUND

Applications including software services and Web services ("services") provide a way to access software functionality that can be reused for a variety of purposes by different clients. Services are usually provided by a server or other entity and are accessed by clients remotely over a network connection, such as a local area network (LAN), a wide area network (WAN), the Internet, etc. Further, a service may provide an application programming interface (API) that can be used by users to access functionality provided by the service.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to Web servers that interact with clients. Such distributed systems may also include data centers that are operated by entities to provide computing resources to customers.

However, as the scale and scope of distributed systems have increased, the tasks of provisioning, administering, and managing the resources have become increasingly complicated. Further, the development environment for a large, enterprise software application that run on such distributed systems may have a very large number of source code components stored in a source code repository. In addition, these source code components may have been modified multiple times throughout the evolution of the software application and present a challenge to tracking code that introduce new bugs or unwanted behavior throughout the software application.

Figure 1:
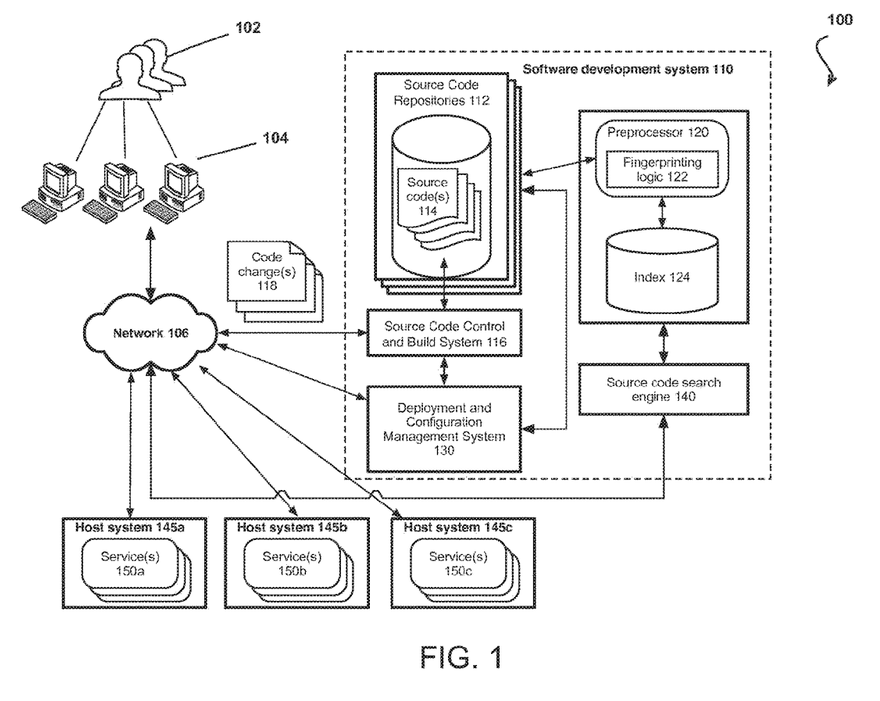
FIG. 1 illustrates an example computing environment in accordance with some embodiments of the subject technology.

FIG. 1 illustrates an example computing environment in accordance with some embodiments of the subject technology. More specifically, FIG. 1 conceptually shows a system and network diagram that includes an operating environment 100 including several software components for providing automated fingerprinting of source code. The environment 100 may include several software/system development personnel 102 that utilize development workstations 104 to access a software development system 110 across a network 106. In an embodiment, the development personnel 102 may include software developers, code reviewers, software testers, project managers, system administrators, and/or other personnel responsible for the development and maintenance of a software system. Such a software system may correspond to one or more services that are provided by host systems 145a, 145b, and 145c. It is appreciated the fewer or more host systems may be provided and still be within the scope of the subject technology.

As further shown in FIG. 1, the host system 145a may be configured to execute instructions to implement one or more services 150a. Such services may include but are not limited to one or more of network-based services (e.g., a Web service), applications, functions, objects, methods (e.g., objected-oriented methods), subroutines, or any other set of computer-executable instructions. Examples of services 150a include any of the services described above. Host systems 145b-c and services 150b-c may be configured in a similar manner.

In an embodiment, the development workstations 104 may be a personal computer ("PC"), a desktop workstation, a laptop, a notebook, mobile computing device, phablet, tablet computer, a personal digital assistant ("PDA"), an electronic-book reader, a game console, a set-top box, a consumer electronics device, a server computer, or any other computing device capable of connecting to the network 106 and communicating with the software development system 110. The network 106 may be a local-area network ("LAN"), a wide-area network ("WAN"), the Internet, and/or any other networking topology or combination of topologies that connects the development workstations 104 to the software development system 110. The software development system 110 may include application servers, database servers, Web servers, and other computing and storage devices that provide development lifecycle services to the development personnel 102. The software development system 110 may be implemented by a company or organization to provide development lifecycle services to development personnel 102, or the software development system 110 may be implemented in "the cloud" to provide services to a variety of organizations across the Internet and/or other networks 106.

In at least one embodiment, the software development system 110 includes one or more source code repositories 112. The source code repositories 112 stores source code 114 including source code components of application software system(s). For example, the source code 114 may represent source code components including source code documents, files, modules, object definitions, methods, functions, groups or lines of code, or any combination of these and other types of source code components. In an embodiment, one or more source code components may be bundled together into a software package ("package" or "packages"). A package may then be further bundled into a package group that is deployed The source code repositories 112 may further store change history and revisions to the source code 114, software revision and version labels or version control information, code dependencies, build scripts, and the like for the software systems. The source code repositories 112 may be maintained by a source code control and build system 116. The source code control and build system 116 may be a component of a software configuration management system (not shown) or may also be a proprietary system implemented by the software development system 110.

For example, software development personnel 102 may utilize the source code control and build system 116 to "check-in" a code change 118 into the source code repositories 112. The code change 118 may comprise a new source code 114, or may represent a change to an existing source code in the source code repositories 112. The software development personnel 102 may utilize the source code control and build system 116 to check-out a code artifact from the source code repositories 112, modify a portion of the code, and then check-in the modified code. In one embodiment, the source code control and build system 116 tracks the individual code changes 118 made to the source code 114 in the source code repositories 112 through the use of a specific identifier, such as a change list number ("CLN"). In addition, the CLN may be utilized to identify individual code changes 118 throughout the development lifecycle, including code review, testing, build and deployment, and operation in the production environment. The source code repositories 112 may further maintain the relationships between code changes 118 and any associated source code 114. The source code control and build system 116 may then build corresponding source code for an application or service (e.g., one of services 150a, 150b or 150c) into executable code that is deployable to one or more host systems for execution. A deployment and configuration management system 130 organizes deployable software (e.g., built executable code) into packages, package groups, and environments. In an embodiment, to track changes over time, packages may be identified by versions and can be grouped together into version-sets using version filters. In an embodiment, the deployment and configuration management system 130 can communicate with the source control and build system 116 to deploy built versions of one or more applications.

In an embodiment, the software development system 110 includes a preprocessor 120 that including fingerprinting logic 122 that performs indexing of the source code 114 to identify parameters of GET and POST request (e.g., HTTP requests) statements and different types of metadata information for the source code 114, among other types of information. By producing an index 124 of source code (stored in the source code repositories 112) that is isolated to the parameters of GET and POST request statements, "fingerprinting" specific actions will allow those actions to be traced to specific source code files, and in many cases the exact line of code. A fingerprint as used herein refers to a combination of parameters or a single instance of a parameter at a specific location in source code. The process of "fingerprinting" as used herein may refer to determining, by the fingerprinting logic 122 of the preprocessor 120, parameter(s) of a HTTP request statement and/or metadata for associating with a keyword in the index of source code (e.g., "source code index") where the keyword comprises the parameter. For example, a fingerprinting algorithm used for fingerprinting may map an arbitrarily large set of data (e.g., source code) to a much smaller set of data, its "fingerprint," that uniquely identifies or associates the large set of data to the smaller set of data. Further a keyword corresponding to the parameter may then be mapped to the fingerprint.

Thus, an advantage is that any web page, and any action on that web page from an HTTP request, can be traced back to the exact line of source code that is accepting that request. In an example, this will enable the capability to find a software defect or security vulnerability while looking at a running application and mapping the software defect or security vulnerability back directly to the line of code that needs to be modified (e.g., the HTTP request statement in accordance with the syntax of the programming language used in a given source code document). As used herein, a statement may refer to the smallest standalone element of a programming language which expresses some action to be carried out (e.g., the HTTP request). Further, the aforementioned metadata included as part of a respective fingerprint may include information pertaining to the programming language(s) for the source code, a package that includes the source code, a package group that includes the package, and/or a computing environment in which the package or package group was deployed as part of a running instance of the application or service, among other types of metadata.

In an embodiment, a source code search engine 140 may receive search requests and perform searches on the index 124 based on input from a user or another application (e.g., a security or auditing service). The source code search engine may return search results including keywords from the index 124 that match search query terms from the search requests. In the case of a collision between two or more source code files, the source code search engine 140 may use the aforementioned metadata included in the index 124 in order to further filter search results. As an example, a dedicated website such as "mhbt123XYZ.com" can be traced to specific packages, which include a set of source code files that have been built. By filtering on these smaller number of packages, the potential for collisions is greatly reduced.

Figure 2:
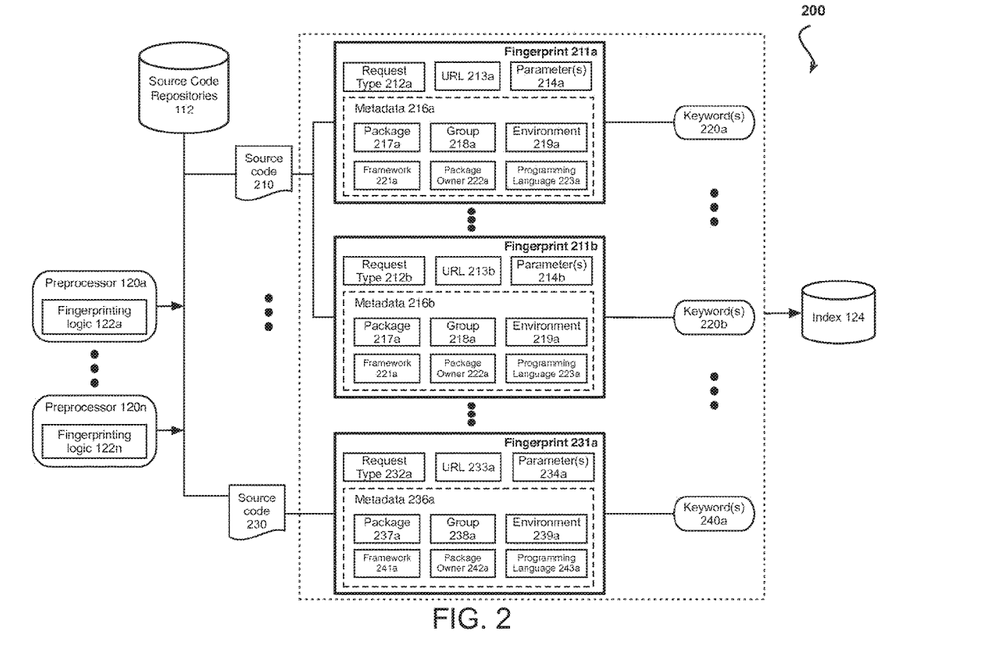
FIG. 2 conceptually illustrates data structures for implementing a source code index, such as the index shown in FIG. 1, in accordance with some embodiments of the subject technology.

FIG. 2 conceptually illustrates data structures 200 for implementing a source code index, such as the index 124 shown in FIG. 1, in accordance with some embodiments of the subject technology. For convenience and conciseness of description, but not to limit possible embodiments, certain items described before are carried forward into FIG. 2, and denoted by the same reference numbers.

The source code index may enable searches conducted across a plurality of source code documents, such as source code documents 210 and 230, in the source code repositories 112. These documents may be represented in the index 124 by respective data structures, such as corresponding fingerprint data structures illustrated by example in FIG. 2. While FIG. 2 two source code documents 210 and 230 are shown for conciseness of illustration, it is appreciated that embodiments of the subject technology could include any number of source code documents. As discussed before in FIG. 1, the preprocessor 120 may include the fingerprinting logic 122 that generates fingerprints of source code stored in the source code repositories 112 in order to identify parameters for corresponding HTTP request statements in the source code. Such source code may include source code documents which are discussed in the example of FIG. 2. In the example of FIG. 2, more than one preprocessor is provided such as a preprocessor 120a with fingerprinting logic 122a and a preprocessor 120n with fingerprinting logic 122n. In an embodiment, a separate preprocessor corresponding to a respective programming language used in source code may be provided for identifying parameters and request statements. For example, a preprocessor for source code written in the PHP programming language may be provided, a separate preprocessor for source code written in the JAVA programming language may be provided, and/or a separate preprocessor for source code written in the PYTHON programming language may be provided etc. It is appreciated that other preprocessors may be provided according to the respective programming language to enable further extensibility of the systems and methods described herein. Additionally, it is also appreciated that while separate preprocessors are described as an example, in another embodiment a single preprocessor may be provided which may include multiple plugins or extensions or modules that each may provide preprocessor functionality to detect request statements and identify parameters for a respective programming language in accordance with the description herein.

Turning to the data structures for the source code documents in more detail, FIG. 2 shows illustrative fields and contents for a fingerprint data structure 211a corresponding to the source code document 210. By reference to the discussion in FIG. 1, a fingerprint data structure may include data pertaining to parameters associated with a HTTP request statement in a source code document, and along with other types of information and/or metadata. Such a HTTP request statement may be found when the statement is consistent with the syntax of a programming language used in the source code document 210. The syntax of the programming language may be a set of rules that defines the combinations of symbols that are considered to be a correctly structured document or fragment in that language. Identifying a HTTP request statement and/or associated parameters therefore may be accomplished, in an example, by parsing the source code document to find a matching pattern of such a request that is specific to the syntax of the programming language used in the source code document. A pattern(s) for identifying a HTTP request and/or associated parameters may be determined for a given programming language based on the syntax specification for the language.

As shown, the fingerprint data structure 211a includes a request type field 212a representing a POST or GET HTTP request type, a URL field 213a representing the URL that was requested, and a parameter field 214a for one or more parameters that were included as part of the request. Other fields may be included in the fingerprint data structure 211a and still be within the scope of the subject technology. For example, a field for a one or more HTTP headers included in the request may be part of the fingerprint data structure 211a. In an example, HTTP headers may include additional information or parameters, including, for example, authorization strings or keys, a host name, a content type, a type of client, cookie information, among other types of information.

Additionally, the fingerprint data structure 211a may include metadata information 216a corresponding to the source code document 210. As shown, the fingerprint data structure 211a includes a package 217a field representing a respective software package in which a built version of the source code document is included, a package group 218a field representing a group of packages that the package represented by the package 217a field, a field for an environment 219a, an application framework 221a that corresponds to what was used in the source code document 210, a package owner 222a corresponding to a user or group or domain or website, etc., and a programming language 223a corresponding to the language used in the source code document 210. As referred to herein, the phrase "application framework" may refer to software libraries, extensions, etc., that have a URL redirect functionality in which the URL redirect functionality determines a structure of a URL pattern for invoking such URL redirect functionality. For example, for a PHP application framework, a URL pattern in accordance to the URL redirect functionality of the PHP application framework may be defined in a first way, but in a JAVA application framework, a URL pattern may be defined differently in the JAVA application framework in comparison. Other metadata fields may be included in the fingerprint data structure 211a and still be within the scope of the subject technology. For example, a field for a line number(s) in the source document 210 indicating the location of the URL 213a or the parameters 214a may be included in the fingerprint data structure 211a. In another embodiment, information pertaining to a user that last modified or "checked-in" changes to the source code document may be provided and included in the metadata.

One or more keywords 220a corresponding to the fingerprint data structure 211a are then generated by the preprocessor 120a based at least in part on the parameters 214a. Such keywords facilitate searching the source code document 210 by matching query terms in a search request to the keyword(s), which would result in the source code document 210 being returned, in this example, as a search result. The fingerprint data structure 211a and the keywords(s) 220 may be stored in the index 124.

As further shown in FIG. 2, a second fingerprint data structure 211b for the source code document 210 may be determined by the fingerprinting logic 122a of the preprocessor 120a. In this example, a second HTTP request statement is found in the source code document 210 in accordance with the syntax of a programming language used in the source code 210. Similar to the fingerprint data structure described above, the second fingerprint data structure 211b includes a request type field 212b representing a POST or GET HTTP request type, a URL field 213b representing the URL that was requested, and a parameter field 214b for one or more parameters that were included as part of the request. The fingerprint data structure 211b may also include metadata information 216b corresponding to the source code document 210. As shown, the fingerprint data structure 211a includes a package 217a field representing a respective software package in which a built version of the source code document is included, a package group 218a field representing a group of packages that the package represented by the package 217a field, a field for an environment 219a, an application framework 221a that corresponds to what was used in the source code document 210, a package owner 222a corresponding to a user or group or domain or website, etc., and a programming language 223a corresponding to the language used in the source code document 210. One or more keywords 220b corresponding to the fingerprint data structure 211b are then generated by the preprocessor 120a based at least in part on the parameters 214b. In an example, the keywords 220a and the keywords 220b are different, and enable different keywords to be associated with the source code document 210 for searching by matching query terms. The fingerprint data structure 211b and the keywords(s) 220 may be stored in the index 124.

As understood, these examples of different fields are given only for ease of discussion, but not to limit implementations of the description herein. Other fields may be included without departing from the scope of the subject technology. Moreover, it is appreciated that not all fields discussed with respect to a fingerprint data structure is required to be included as shown in the example of FIG. 2.

The source code repositories 112 may include additional source code documents for a given application, and therefore other source code documents, such as source code document 230, may be represented in data structures. The source code document 230, however, may be written is a different programming language than the source code document 210 described before, and as a result, a different preprocessor 120n, corresponding to that programming language, may use its fingerprinting logic 122n to determine request statements and identify parameters in the source code document 230. In this example, a fingerprint data structure 231a may represent the source code document 230 and contain fields and contents similar to those shown for the fingerprint data structures 211b and 211b as discussed above. As illustrated, the fingerprint data structure 231a includes a request type field 232a representing a POST or GET HTTP request type, a URL field 233a representing the URL that was requested, and a parameter field 234a for one or more parameters that were included as part of the request in the source code document 230. Further, fingerprint data structure 231a may also include metadata information 236a corresponding to the source code document 230. As shown, the fingerprint data structure 231a includes a package 237a field representing a respective software package in which a built version of the source code document is included, a package group 238a field representing a group of packages that the package represented by the package 237a field, a field for an environment 239a, an application framework 241a that corresponds to what was used in the source code document 230, a package owner 242a corresponding to a user or group or domain or website, etc., and a programming language 243a corresponding to the language used in the source code document 210. One or more keywords 240a corresponding to the fingerprint data structure 231a are then generated by the preprocessor 120n based at least in part on the parameters 234a. The keywords 240a facilitate searching the source code document 230 by matching query terms in a search request to the keywords. The fingerprint data structure 231a and the keywords(s) 240a may be stored in the index 124.

Figure 3A:
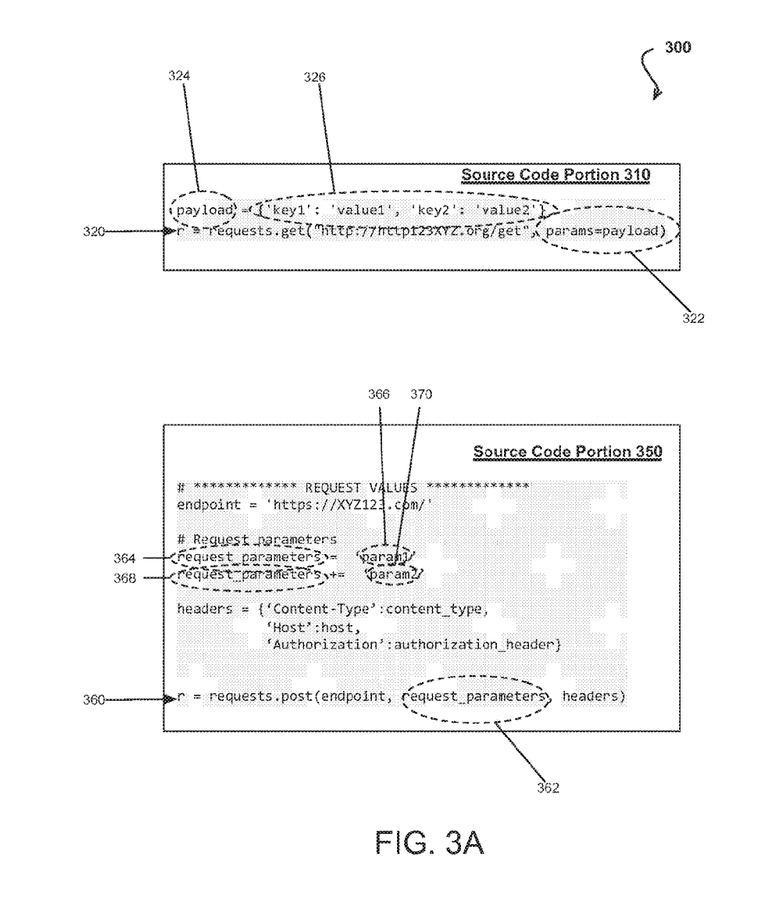
FIG. 3A conceptually illustrate examples where HTTP request statements and corresponding parameters are found in respective source code portions.

FIG. 3A conceptually illustrate examples 300 where HTTP request statements and corresponding parameters are found in respective source code portions. The example of FIG. 3A shows a source code portion 310 and a source code portion 350, which may be included in respective source code documents (or, alternatively, in a single source code document). In an embodiment, the preprocessor 120 in FIG. 1 may identify a HTTP request statement(s) and extract one or more parameters that are associated with such a request in a source code portion for including in a source code index. The source code index, as discussed before, may include fingerprint data structures representing one or more source code documents and/or corresponding metadata that each facilitate searching request parameters in source code documents.

As shown, the source code portion 310 includes a HTTP request statement 320 at a particular line of code, in accordance with the syntax of a programming language, which invokes a HTTP GET request of a web site at a HTTP address ("http://http123XYZ.org/get"). The preprocessor 120 may identify that the portion of the HTTP request statement 320 corresponds to a request parameter 322. In this example, based on the syntax of the programming language, the preprocessor 120 determines that the string "payload" represents the value of the request parameter for the HTTP request statement 320. In an embodiment, the preprocessor 120 may then look throughout the source code portion 310 to find whether the string "payload" may include another statement that further defines other request parameters for the HTTP request statement 320. At another line of code, an assignment statement assigns a string corresponding to a parameter "payload" 324 to additional request parameters 326. Thus, an example fingerprint of the source code portion 310 may have request parameters corresponding to "key1" and "key2" be associated with the HTTP request statement 320. The request parameters "key1" and "key2" can further be used as keywords to facilitate searching of the source code portion 310 and to determine the line of code where the HTTP request statement 320 is included in the source code document that contains the source code portion 310.

As shown in another example, the source code portion 350 includes a HTTP request statement 360 at a particular line of code, in accordance with the syntax of a programming language, which invokes a HTTP POST request of a web site at a HTTP address ("https://XYZ123.com"). The preprocessor 120 may identify that the portion of the HTTP request statement 360 corresponds to a request parameter 362. In this example, based on the syntax of the programming language, the preprocessor 120 determines that the string "request_parameters" represents the value of the request parameter for the HTTP request statement 360. In an embodiment, the preprocessor 120 may then look throughout the source code portion 350 to find whether the string "request_parameters" may include another statement(s) that further defines other request parameters for the HTTP request statement 360. At another line of code, an assignment statement assigns a string corresponding to a parameter "request_parameters" 364 to additional request parameter 366. At yet another line of code, an addition assignment statement ("+=") assigns a string corresponding to a parameter "request_parameters" 368 to additional request parameter 370. An example fingerprint of the source code portion 350 may have request parameters corresponding to "param1" and "param2" be associated with the HTTP request statement 360. The request parameters "param1" and "param2" can therefore be used as keywords to facilitate searching of the source code portion 350 and to determine the line of code where the HTTP request statement 360 is included in the source code document that contains the source code portion 350.

Figure 3B:
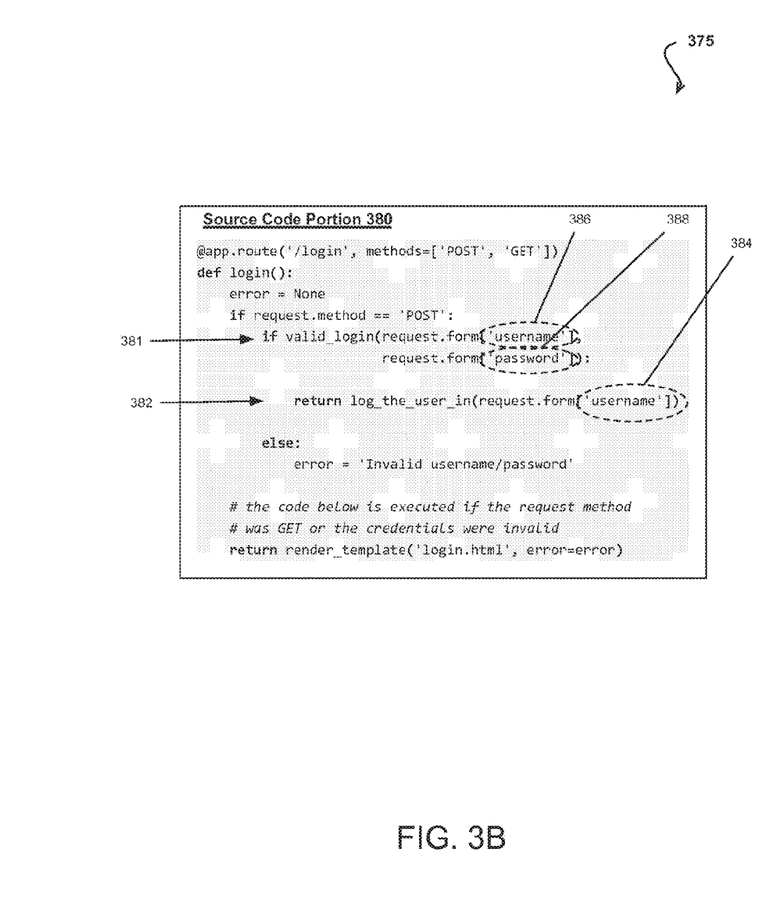
FIG. 3B conceptually illustrate an example where one or more HTTP request statements and corresponding parameter(s) are found in a respective source code portion.

FIG. 3B conceptually illustrate an example 375 where one or more HTTP request statements and corresponding parameter(s) are found in a respective source code portion 380.

The example of FIG. 3B shows the source code portion 380, which may be included in respective source code documents (or, alternatively, in a single source code document). In an embodiment, the preprocessor 120 in FIG. 1 may identify a HTTP request statement(s) (e.g., in accordance with the syntax of the programming used in the source code portion 380) and extract one or more parameters that are associated with such a request in a source code portion for including in a source code index. The example source code portion 380 may handle requests to a login URL in response to parameters corresponding to a user login and/or password being provided (e.g., in a login submission form).

As shown, the source code portion 380 includes a HTTP request statement 381 at a particular line of code, in accordance with the syntax of a programming language, which invokes a HTTP request for checking parameters for a username and password to determine whether the submitted credentials are valid. The preprocessor 120 may identify that the portion of the HTTP request statement 320 that includes a request for a "valid_login" function with request parameters 386 and 388. In this example, based on the syntax of the programming language, the preprocessor 120 determines that the string "username" and "password" represents respective request parameters for the "valid_login" function included in the HTTP request statement 381. In an embodiment, the preprocessor 120 may then look throughout the remaining portion of source code portion 380 to find another HTTP request statement. In this example, a second HTTP request statement 382 for a "log_the_user_in" function is determined by the preprocessor 120, and a request parameter 384 for the "log_the_user_in" function is determined to be included in the HTTP request statement 381. Thus, an example fingerprint of the source code portion 380 may have request parameters corresponding to "username" and "password" be associated with the HTTP request statement 381 and/or the request parameter corresponding to "username" be associated with the HTTP request statement 382. The request parameters "username" and "password" can further be used as keywords to facilitate searching of the source code portion 380 and to determine the respective lines of code where the HTTP request statement 381 and/or 382 are included in the source code document that contains the source code portion 380.

Figure 4:
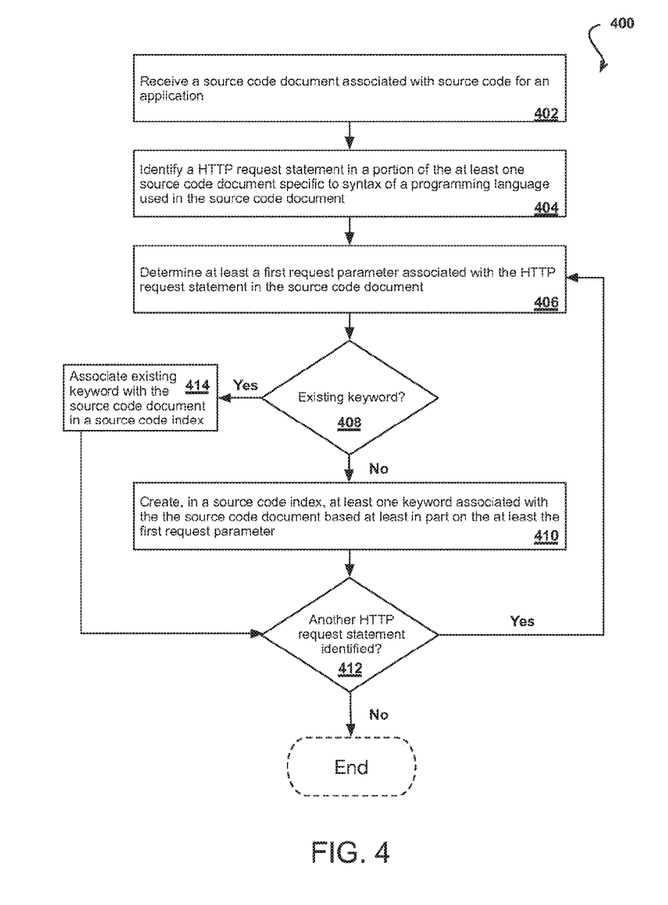
FIG. 4 illustrates an example process for indexing source code documents that can be used in accordance with various embodiments.

FIG. 4 illustrates an example process 400 for indexing source code documents that can be used in accordance with various embodiments. Although this figure, as well as other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments. The process 400 may be implemented by one or more computing devices or systems in some embodiments.

At step 402, at least one source code document associated with source code for an application is received. The source code document is to be indexed into an index file where the at least one source code document includes at least one request parameter and at least one HTTP request statement associated with the at least one request parameter. At step 404, a HTTP request statement is identified in a portion of the at least one source code document. The HTTP request statement is associated with a programming language used in the at least one source code document. In an embodiment, identifying the HTTP request statement includes parsing the at least one source code document to find a match of a respective HTTP request statement that is specific to syntax of the programming language used in the at least one source code document. A pattern matching algorithm is used to find the match by matching one or more patterns specific to the syntax of the programming language that correspond to the respective HTTP request statement in an example.

At step 406, it is determined whether at least a first request parameter is in the at least one source code document where the first request parameter associated with the HTTP request statement. In an embodiment, determining the at least first request parameter includes parsing the HTTP request statement to identify at least one request parameter that is included as part of the HTTP request statement, parsing the at least one source code document to identify a second portion of the at least one source code document that includes a second statement, the second statement defining the at least one request parameter based at least in part on syntax specific to the programming language, and extracting a textual parameter string corresponding to the at least one request parameter based at least in part on the second statement.

At step 408, a determination is made whether an existing keyword exists in a source code index. If not, at step 410, at least one keyword associated with the at least one source code document is created in the source code index based at least in part on the at least the first request parameter, and the at least one keyword includes the at least the first request parameter. In this manner, generating a source code index can be based at least in part on the at least the first request parameter associated with the HTTP request statement. Creating at least one keyword in the source code index further includes storing the textual parameter string in the source code index as a respective keyword associated with at least one source code document, the respective keyword used for matching a search query term to the at least one source code document in an example. Alternatively, if an existing keyword does exist at step 408, at step 414 the existing keyword is associated with the source code document in the source code index.

At step 412, it is determined whether another HTTP request statement is identified in the source code document. If so, the process 400 continues to step 406 to repeat the subsequent steps. Otherwise, the process 400 may end.

Figure 5:
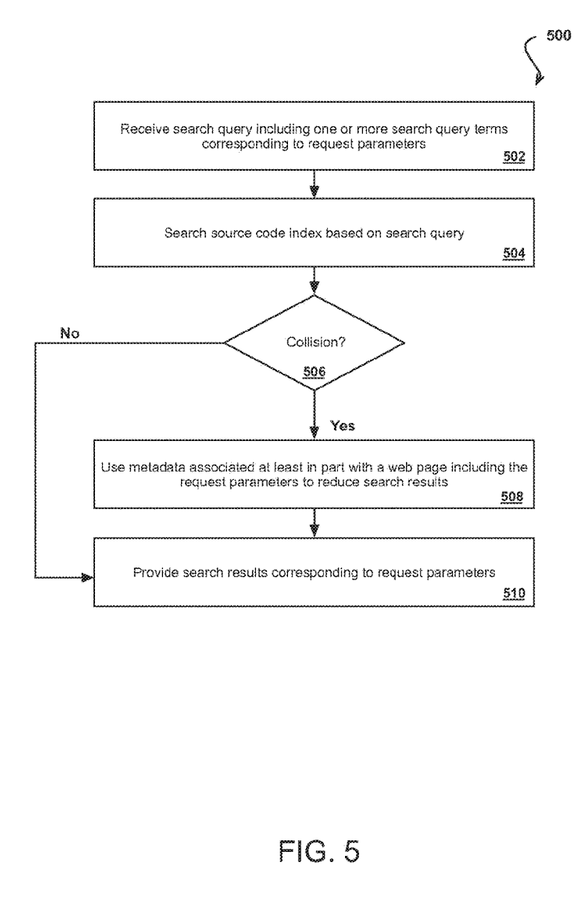
FIG. 5 illustrates an example process for performing a search in a source code index that can be utilized in accordance with various embodiments.

FIG. 5 illustrates an example process 500 for performing a search in a source code index that can be utilized in accordance with various embodiments. The process 500 may be implemented by one or more computing devices or systems in some embodiments.

At step 502, a search query is received including one or more search query terms corresponding to request parameters. At step 504, a source code index is searched based on search query. Based on search results, at step 506, it is determined whether a collision of search results has occurred (e.g., where too many search results are returned corresponding to the request parameters). If so, at step 508, metadata associated at least in part with a web page including the request parameters may be used to reduce search results. Such metadata, as discussed before, may include information pertaining to a package, group of packages and/or environment in which the package is deployed. By filtering search results to match such metadata, a number of search results may be reduced to provide more relevant results. In an example where a search query is looking for multiple parameters, first metadata associated with results for a first parameter and second metadata for a second parameter may be combined in order to further filter out search results. At step 510, search results corresponding to request parameters are provided. If no collision is determined at step 506, alternatively, at step 510, search results corresponding to request parameters are provided without using the metadata described previously in step 508.

Figure 6:
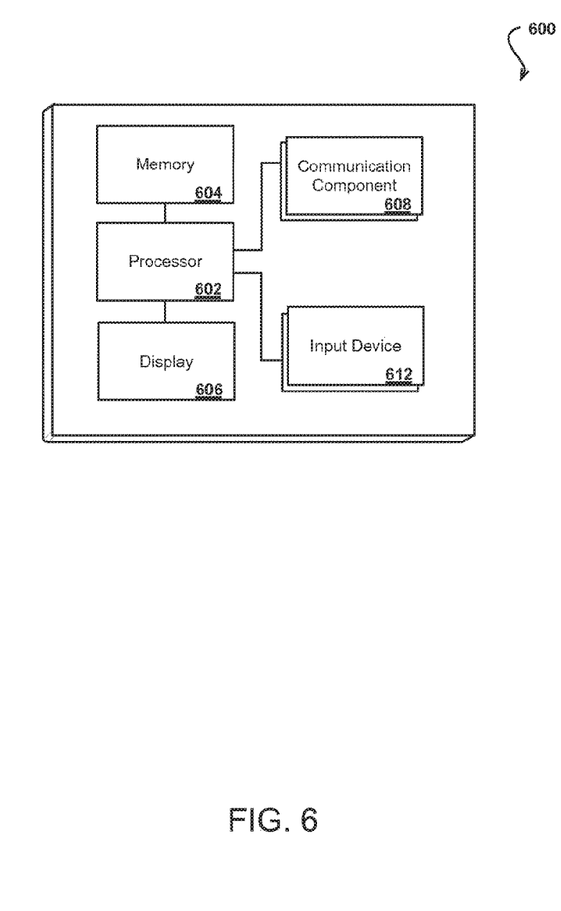
FIG. 6 illustrates example components of a client computing device in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input device 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more communication components 608, such as a Wi-Fi, Bluetooth, RF, wired, or wireless communication system. The device in many embodiments can communicate with a network, such as the Internet, and may be able to communicate with other such devices.

Figure 7:
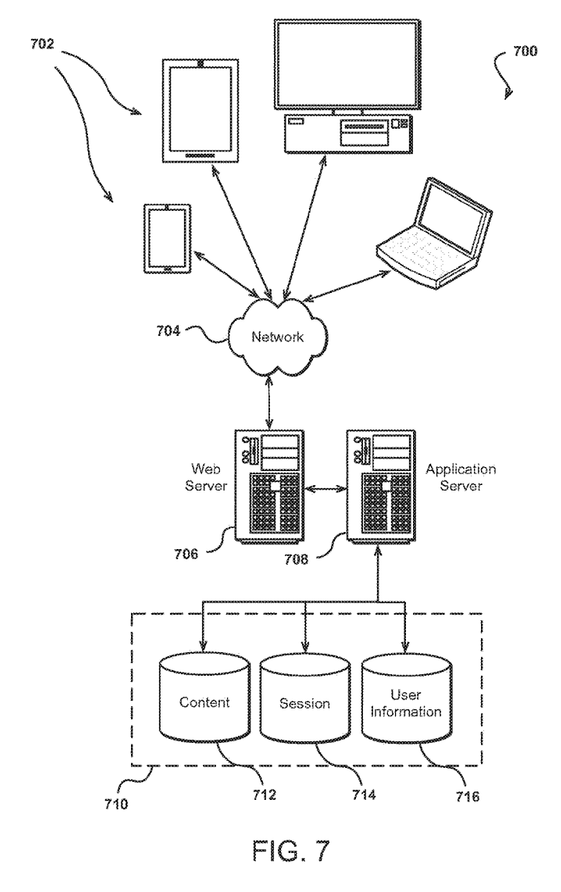
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
one or more processors; and
memory that stores computer-executable instructions that, if executed, cause the system to implement one or more services, wherein the one or more services:
identify a Web service request;
determine a first fingerprint for the Web service request;
locate, within a source code file, a request instruction, the request instruction having a second fingerprint that matches the first fingerprint of the Web service request; and
determine that performance of executable code associated with the request instruction is a source of the Web service request.

2. The system of claim 1, wherein the one or more services further:
generate the second fingerprint based at least in part on a syntax of the request instruction in the source code file; and
generate the first fingerprint based at least in part on a function signature of the Web service request.

3. The system of claim 2, wherein the one or more services further:
identify a set of parameters of the Web service request; and
determine the function signature of the Web service request based at least in part on the set of parameters.

4. The system of claim 1, wherein the one or more services further:
generate a source code index by storing a textual parameter string as a respective keyword associated with the source code file, the respective keyword usable for matching a search query term to the source code file.

5. The system of claim 4, wherein the one or more services further:
generate metadata associated with the source code file, wherein generating the metadata includes:
determining first metadata information corresponding to a software package associated with the source code file, the software package including executable software built at least in part from the source code file;
determining second metadata information corresponding to a computing environment, the computing environment including at least one host system running at least one service where the software package is deployed as part of a running instance of the at least one service; and
storing the metadata associated with the source code file as part of the source code index.

6. A computer-implemented method comprising:
identifying a Web service request;
determining a fingerprint for the Web service request;
locating, within a source code file, a request instruction, the request instruction having a matching fingerprint that matches the fingerprint of the Web service request; and
determining that the performance of executable code associated with the request instruction is a source of the Web service request.

7. The computer-implemented method of claim 6, further comprising:
receiving a second source code file associated with a second application;
identifying a second request statement in the second source code file;
determining at least one second request parameter in the second source code file, the at least one second request parameter associated with the second request statement;
determining whether at least one existing keyword matches the at least one second request parameter; and
associating the at least one existing keyword to the second source code file.

8. The computer-implemented method of claim 6, further comprising:
parsing the source code file to locate a match of a respective request statement at a line of code in the source code file, the respective request statement being in accordance with syntax of a programming language used in the source code file.

9. The computer-implemented method of claim 6, further comprising:
analyzing the request instruction located at a line of code in the source code file to identify at least one request parameter that is included as part of the request instruction; and
assigning a keyword corresponding to the at least one request parameter, the keyword to be associated with at least the source code file to facilitate searching the source code file.

10. The computer-implemented method of claim 6, wherein a source code search engine performs search queries on source code documents stored in source code repositories, the source code repositories corresponding to a plurality of applications that are deployed in at least one host system.

11. The computer-implemented method of claim 10, wherein the search engine further uses metadata associated with one or more source code documents to filter search results indicating respective source code documents.

12. The computer-implemented method of claim 11, wherein the metadata includes information pertaining to a package, a group of packages, or an environment that includes a deployed application.

13. A non-transitory computer-readable storage medium having stored thereon executable instructions that, as a result of being executed by one or more processors of a computer system, cause the computer system to at least:
identify a Web service request;
determine a fingerprint for the Web service request;
locate, within a source code file, a request instruction, the request instruction having a matching fingerprint that matches the fingerprint of the Web service request; and
determine that the performance of executable code associated with the request instruction is a source of the Web service request.

14. The non-transitory computer-readable storage medium of claim 13, wherein the executable instructions further comprise instructions that, as a result of being executed by the one or more processors, cause the computer system to:
receive a second source code document associated with source code for a second application;
identify a second request statement in the second source code document;

determine at least one second request parameter in the second source code document, the at least one second request parameter associated with the second request statement;

determine whether at least one existing keyword matches the at least one second request parameter; and associate the at least one existing keyword to the second source code document.

15. The non-transitory computer-readable storage medium of claim 13, wherein the executable instructions further comprise instructions that, as a result of being executed by the one or more processors, cause the computer system to:

parse the source code file to locate a match of a respective request statement at a line of code in the source code file, the respective request statement being in accordance with syntax of a programming language used in the source code file.

16. The non-transitory computer-readable storage medium of claim 13, wherein the executable instructions further comprise instructions that, as a result of being executed by the one or more processors, cause the computer system to:

analyze the request instruction located at a line of code in the source code file to identify at least one request parameter that is included as part of the request instruction; and assign a keyword corresponding to the at least one request parameter, the keyword to be associated with at least the source code file to facilitate searching the source code file.

17. The non-transitory computer-readable storage medium of claim 13, wherein a source code search engine performs search queries on source code documents stored in source code repositories, the source code repositories corresponding to a plurality of applications that are deployed in at least one host system.

18. The non-transitory computer-readable storage medium of claim 17, wherein the search engine further uses metadata associated with one or more source code documents to filter search results indicating respective source code documents.

19. The non-transitory computer-readable storage medium of claim 18, wherein the metadata includes information pertaining to a package, a group of packages, or an environment that includes a deployed application.

20. The non-transitory computer-readable storage medium of claim 13, wherein:

the fingerprint identifies a combination of one or more parameters at a location in the source code file; and the location in the source code file is associated with instructions that, if executed, process the Web service request.

* * * * *